(12) United States Patent
Sun et al.

(10) Patent No.: US 11,184,809 B2
(45) Date of Patent: Nov. 23, 2021

(54) METHOD FOR DETERMINING DATA FORWARDING TUNNEL, ACCESS AND MOBILITY MANAGEMENT FUNCTION ENTITY, AND BASE STATION

(71) Applicant: CHINA ACADEMY OF TELECOMMUNICATIONS TECHNOLOGY, Beijing (CN)

(72) Inventors: Jiancheng Sun, Beijing (CN); Hucheng Wang, Beijing (CN); Ying Wang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 16/758,017

(22) PCT Filed: Aug. 28, 2018

(86) PCT No.: PCT/CN2018/102685
§ 371 (c)(1),
(2) Date: Apr. 21, 2020

(87) PCT Pub. No.: WO2019/095781
PCT Pub. Date: May 23, 2019

(65) Prior Publication Data
US 2020/0322851 A1    Oct. 8, 2020

(30) Foreign Application Priority Data

Nov. 16, 2017    (CN) .......................... 201711140614.X (51) Int. Cl.
*H04W 36/00*    (2009.01)
(52) U.S. Cl.
CPC ... *H04W 36/0022* (2013.01); *H04W 36/0016* (2013.01); *H04W 36/0044* (2013.01)

(58) Field of Classification Search
CPC ....... H04W 12/00514; H04W 36/0022; H04W 36/0066; H04W 36/14; H04W 60/00;
(Continued)

(56) References Cited

U.S. PATENT DOCUMENTS 10,694,434 B2 * 6/2020 Ryu ...................... H04W 36/14
2009/0046660 A1   2/2009 Casati et al.
(Continued)

FOREIGN PATENT DOCUMENTS

CN    101374349 A    2/2009
CN    101730075 A    6/2010
(Continued)

OTHER PUBLICATIONS

International Search Report in the international application No. PCT/CN2018/102685, dated Nov. 21, 2018.
(Continued)

*Primary Examiner* — Robert J Lopata
(74) *Attorney, Agent, or Firm* — Ladas & Parry, LLP (57) ABSTRACT

A method for determining a data forwarding tunnel, an AMF entity, and a base station (BS) are provided. The method includes: receiving data forwarding information of target UE forwarded by MME, and acquiring a QoS flow configured by a 5G core network for each bearer of the target UE, and mapping relationship between a bearer and a QoS flow, where the data forwarding information includes a list of bearers allocated by EPS to the target UE and an indication of a determination by a 4G BS as to whether each bearer of the target UE has data to forward; transmitting the data forwarding information, the configured QoS flow, and the mapping relationship to a target 5G BS; and receiving forwarding tunnel information of a 5G BS configured for the
(Continued)

target UE by the target 5G BS according to the data forwarding information, the configured QoS flow, and the mapping relationship.

6 Claims, 5 Drawing Sheets

(58) Field of Classification Search
CPC ....... H04W 60/06; H04W 8/02; H04W 92/02; H04W 36/0011
USPC .......................................................... 370/331
See application file for complete search history.

(56) References Cited

U.S. PATENT DOCUMENTS

| | | | |
|---|---|---|---|
| 2011/0310850 A1 | 12/2011 | Klingenbrunn et al. | |
| 2011/0310851 A1 | 12/2011 | Klingenbrunn et al. | |
| 2015/0358886 A1 | 12/2015 | Qin | |
| 2017/0195935 A1 | 7/2017 | Xu et al. | |
| 2017/0339609 A1* | 11/2017 | Youn | H04W 76/11 |
| 2018/0192337 A1* | 7/2018 | Ryu | H04W 36/0066 |
| 2018/0376384 A1* | 12/2018 | Youn | H04W 8/02 |
| 2019/0335365 A1* | 10/2019 | Ying | H04W 36/14 |
| 2020/0059817 A1* | 2/2020 | Baek | H04W 28/0273 |
| 2020/0068445 A1* | 2/2020 | Wu | H04W 36/00 |
| 2020/0077315 A1* | 3/2020 | Jin | H04W 36/00 |
| 2020/0092710 A1* | 3/2020 | Kim | H04W 60/06 |
| 2020/0112522 A1* | 4/2020 | Dannebro | H04W 36/14 |
| 2020/0112885 A1* | 4/2020 | Jin | H04W 36/0055 |
| 2020/0112894 A1* | 4/2020 | Koshimizu | H04W 36/0022 |
| 2020/0221539 A1* | 7/2020 | Yang | H04W 48/16 |
| 2020/0229059 A1* | 7/2020 | Xu | H04W 36/0044 |
| 2020/0252849 A1* | 8/2020 | Tang | H04W 8/24 |
| 2020/0267617 A1* | 8/2020 | Larsen | H04W 36/30 |
| 2020/0275331 A1* | 8/2020 | Kim | H04W 36/0033 |

FOREIGN PATENT DOCUMENTS

| | | |
|---|---|---|
| CN | 101784033 A | 7/2010 |
| CN | 102238757 A | 11/2011 |
| CN | 102948215 A | 2/2013 |
| CN | 103096400 A | 5/2013 |
| CN | 104812096 A | 7/2015 |
| CN | 107113670 A | 8/2017 |
| EP | 2385722 A1 | 11/2011 |
| WO | 2017000694 A1 | 1/2017 |

OTHER PUBLICATIONS

Written Opinion of the International Searching Authority in the international application No. PCT/CN2018/102685 dated Nov. 21, 2018 with English translation provided by Wipo Translate.
Samsung, "QOS Aspect in case of Xn mobility," 3GPP TSG-RAN WG3 #Ad-hoc R3-170041, Jan. 2017.
Huawei, "Flow based QoS during Handover," 3GPP TSG-RAN WG3 NR Ad-hoc R3-170253, Jan. 2017.
First Office Action issued in Chinese application No. 201711140614.X, dated Feb. 26, 2020.
CATT, "Discussion on inter system data forwarding," 3GPP TSG-RAN WG3 #97bis R3-173613, Oct. 2017.
Samsung, "Data forwarding for Inter-system handover from EPS to 5GS," 3GPP TSG-RAN WG3 Meeting #97bis R3-173836, Oct. 2017.
Nokia, "23.502: Updates to EPS HO Call flow," 3GPP TSG SA WG2 Meeting #120 S2-172049, Mar. 2017.
Extended European Search Report from EP app. No. 18878212.2, dated Oct. 7, 2020.
"23.50: handover from EPS to 5GS procedure using Nx interface", S2-174564, SA WG2 Meeting #122, Cabo, Mexico, Jun. 26-30, 2017.
3rd Generation Partnership Project; Technical Specification Group Services and System Aspects; Procedures for the 5G System; Stage 2 (Release 15), 3GPP TS 23.502 V1.2.0, Sep. 2017.
Notice of Reason for Refusal from JP app. No. 2020-526474, dated Jun. 15, 2021, with English translation from Global Dossier.
"LS on the need for EPS Bearer ID knowledge in NG-RAN for inter-system handover from 5GS to EPS", R3-174201, 3GPP TSG RAN WG3 Meeting #97bis, Prague, Czech Republic, Oct. 9-13, 2017.

* cited by examiner

Transmitting data forwarding information to an MME if target UE satisfies a system handover condition, where the data forwarding information is forwarded to an AMF via the MME ⎯ 301

METHOD FOR DETERMINING DATA FORWARDING TUNNEL, ACCESS AND MOBILITY MANAGEMENT FUNCTION ENTITY, AND BASE STATION

CROSS-REFERENCE TO RELATED APPLICATIONS

This application is a U.S. national phase application of a PCT Application No. PCT/CN2018/102685 filed on Aug. 28, 2018, which claims priority to Chinese Patent Application No. 201711140614.X filed in China on Nov. 16, 2017, the disclosures of which are incorporated in their entireties by reference herein.

TECHNICAL FIELD

The present disclosure relates to the field of communication technology, in particular to a method for determining a data forwarding tunnel, an access and mobility management function (AMF) entity, and a base station.

BACKGROUND

With the development of mobile communication systems, fifth-generation mobile communication (5G) systems are undergoing rapid development. A 5G system can provide user equipment (UE) with larger bandwidth and a higher transmission rate. 5G network deployment is far from perfection at earlier stage, whereas Long Term Evolution (LTE) networks are well established in terms of coverage and technology. Therefore, to provide UE with better services and ensure service continuity, it is particularly vital to support a seamless handover of UE between a 5G system and a mainstream LTE system.

A protocol data unit (PDU) session of a 5G system and a public data network (PDN) connection of an evolved packet system (EPS) have different forms. The 5G system uses a PDU session to manage a plurality of quality of service (QoS) flows. The EPS uses a PDN connection to manage a plurality of EPS bearers. A bearer conversion is performed during an inter-radio access technology (inter-RAT) handover. The function of a bearer conversion is completed in a core network.

Particularly, for a data forwarding function, during a conventional handover process from an EPS to a 5G system, a mobility management entity (MME) is required to configure EPS bearer information and mapped PDU session information for a fourth-generation mobile communication (4G) base station when establishing a PDN connection. When a handover to the 5G system is required subsequently, the 4G base station indicates, according to a format (a PDU session+a QoS flow) in a target system to which a current bearer mapped, whether a QoS flow has data to forward, which impacts an EPS in the related art, and increases signaling overhead.

SUMMARY

An object of the present disclosure is to provide a method for determining a data forwarding tunnel, an AMF entity, and a base station, to implement allocation of a data forwarding tunnel in a handover from an EPS to a 5G system without impacting the EPS in the related art and without increasing signaling overhead, thereby ensuring the completion of data forwarding.

To achieve the foregoing object, the present disclosure provides in some embodiments a method for determining a data forwarding tunnel, applied to an AMF entity, including:

receiving data forwarding information of target UE forwarded by an MME, and acquiring a QoS flow configured by a 5G core network for each bearer of the target UE and a mapping relationship between a bearer and a QoS flow, where the data forwarding information includes a list of bearers allocated by an EPS to the target UE and an indication of a determination by a source 4G base station as to whether each bearer corresponding to the target UE has data to forward;

transmitting the data forwarding information, the configured QoS flow, and the mapping relationship between a bearer and a QoS flow to a target 5G base station; and receiving forwarding tunnel information of a 5G base station configured for the target UE by the target 5G base station according to the data forwarding information, the configured QoS flow, and the mapping relationship between a bearer and a QoS flow.

The receiving data forwarding information of target UE forwarded by an MME includes:

receiving a forward relocation request transmitted by the MME after the MME receives a Handover Required message transmitted by the source 4G base station, where the Handover Required message carries the data forwarding information, and the forward relocation request carries the data forwarding information, where the data forwarding information is located in transparent containers of the Handover Required message and the forward relocation request respectively; or, the data forwarding information is located in information elements (IEs) of the Handover Required message and the forward relocation request respectively.

The transmitting the data forwarding information, the configured QoS flow, and the mapping relationship between a bearer and a QoS flow to a target 5G base station includes:

transmitting a handover request to the target 5G base station, where the handover request carries the data forwarding information, the configured QoS flow, and the mapping relationship between a bearer and a QoS flow, where the data forwarding information is located in a transparent container of the handover request; or, the data forwarding information is located in an IE of the handover request.

The receiving forwarding tunnel information of a 5G base station configured for the target UE by the target 5G base station includes:

receiving a handover request acknowledgement (ACK) transmitted by the target 5G base station according to the handover request, where the handover request ACK includes the forwarding tunnel information of the 5G base station, where if the data forwarding information is located in the transparent container of the handover request, the forwarding tunnel information of the 5G base station includes a 5G base station forwarding tunnel of the target UE and a bearer and/or a QoS flow of the target UE that has data to forward;

if the data forwarding information is located in the IE of the handover request, the forwarding tunnel information of the 5G base station includes the 5G base station forwarding tunnel of the target UE.

The method further includes: acquiring, according to the forwarding tunnel information of the 5G base station, a forwarding tunnel of the 5G core network configured by the 5G core network for the target UE, and transmitting the forwarding tunnel of the 5G core network to the MME, where the MME allocates a forwarding tunnel of a 4G core network to the target UE and transmits the forwarding tunnel of the 4G core network to the source 4G base station.

To achieve the foregoing object, the present disclosure further provides in some embodiments a method for determining a data forwarding tunnel, applied to a 4G base station, including:

transmitting data forwarding information to an MME if target UE satisfies a system handover condition, where the data forwarding information is forwarded to an AMF entity via the MME, where the data forwarding information includes a list of bearers allocated by an EPS to the target UE and an indication of a determination by the 4G base station as to whether each bearer corresponding to the target UE has data to forward.

The transmitting data forwarding information to an MME includes:

transmitting a Handover Required message carrying the data forwarding information to the MME, where the data forwarding information is located in a transparent container of the Handover Required message; or, the data forwarding information is located in an IE of the Handover Required message.

To achieve the foregoing object, the present disclosure further provides in some embodiments a method for determining a data forwarding tunnel, applied to a 5G base station, including:

receiving data forwarding information of target UE, a configured QoS flow, and a mapping relationship between a bearer and a QoS flow that are transmitted by an AMF entity, where the data forwarding information includes a list of bearers allocated by an EPS to the target UE and an indication of a determination by a source 4G base station as to whether each bearer corresponding to the target UE has data to forward;

configuring forwarding tunnel information of a 5G base station for the target UE according to the data forwarding information, the configured QoS flow, and the mapping relationship between a bearer and a QoS flow; and transmitting the forwarding tunnel information of the 5G base station to the AMF.

The receiving data forwarding information of target UE, a configured QoS flow, and a mapping relationship between a bearer and a QoS flow that are transmitted by an AMF entity includes:

receiving a handover request transmitted by the AMF entity, where the handover request carries the data forwarding information, the configured QoS flow, and the mapping relationship between a bearer and a QoS flow, where the data forwarding information is located in a transparent container of the handover request; or, the data forwarding information is located in an IE of the handover request.

The transmitting the forwarding tunnel information of the 5G base station to the AMF includes:

transmitting a handover request ACK to the AMF according to the handover request, where the handover request ACK carries the forwarding tunnel information of the 5G base station, where if the data forwarding information is located in the transparent container of the handover request, the forwarding tunnel information of the 5G base station includes a 5G base station forwarding tunnel of the target UE and a bearer and/or a QoS flow of the target UE that has data to forward;

if the data forwarding information is located in the IE of the handover request, the forwarding tunnel information of the 5G base station includes the 5G base station forwarding tunnel of the target UE.

To achieve the foregoing object, the present disclosure further provides in some embodiments an AMF entity, including: a transceiver, a storage, a processor, and a computer program stored in the storage and configured to be executed by the processor, where the transceiver is configured to: receive data forwarding information of target UE forwarded by an MME, and acquire a QoS flow configured by a 5G core network for each bearer of the target UE and a mapping relationship between a bearer and a QoS flow, where the data forwarding information includes a list of bearers allocated by an EPS to the target UE and an indication of a determination by a source 4G base station as to whether each bearer corresponding to the target UE has data to forward; transmit the data forwarding information, the configured QoS flow, and the mapping relationship between a bearer and a QoS flow to a target 5G base station; and receive forwarding tunnel information of a 5G base station configured for the target UE by the target 5G base station according to the data forwarding information, the configured QoS flow, and the mapping relationship between a bearer and a QoS flow.

The transceiver is further configured to receive a forward relocation request transmitted by the MME after the MME receives a Handover Required message transmitted by the source 4G base station, where the Handover Required message carries the data forwarding information, and the forward relocation request carries the data forwarding information, where the data forwarding information is located in transparent containers of the Handover Required message and the forward relocation request respectively; or, the data forwarding information is located in IEs of the Handover Required message and the forward relocation request respectively.

The transceiver is further configured to transmit a handover request to the target 5G base station, where the handover request carries the data forwarding information, the configured QoS flow, and the mapping relationship between a bearer and a QoS flow, where the data forwarding information is located in a transparent container of the handover request; or, the data forwarding information is located in an IE of the handover request.

The transceiver is further configured to receive a handover request ACK transmitted by the target 5G base station according to the handover request, where the handover request ACK includes the forwarding tunnel information of the 5G base station, where if the data forwarding information is located in the transparent container of the handover request, the forwarding tunnel information of the 5G base station includes a 5G base station forwarding tunnel of the target UE and a bearer and/or a QoS flow of the target UE that has data to forward;

if the data forwarding information is located in the IE of the handover request, the forwarding tunnel information of the 5G base station includes the 5G base station forwarding tunnel of the target UE.

The transceiver is further configured to: acquire, according to the forwarding tunnel information of the 5G base station, a forwarding tunnel of the 5G core network configured by the 5G core network for the target UE, and transmit the forwarding tunnel of the 5G core network to the MME, where the MME allocates a forwarding tunnel of a 4G core network to the target UE and transmits the forwarding tunnel of the 4G core network to the source 4G base station.

To achieve the foregoing object, the present disclosure further provides in some embodiments a base station, applied to a 4G system, including: a transceiver, a storage, a processor, and a computer program stored in the storage and configured to be executed by the processor, where the transceiver is configured to: transmit data forwarding information to an MME if target UE satisfies a system handover condition, the data forwarding information is forwarded to an AMF entity via the MME, where the data forwarding information includes a list of bearers allocated by an EPS to the target UE and an indication of a determination by the base station as to whether each bearer corresponding to the target UE has data to forward.

The transceiver is further configured to transmit a Handover Required message carrying the data forwarding information to the MME, where the data forwarding information is located in a transparent container of the Handover Required message; or, the data forwarding information is located in an IE of the Handover Required message.

To achieve the foregoing object, the present disclosure further provides in some embodiments a base station, applied to a 5G system, including: a transceiver, a storage, a processor, and a computer program stored in the storage and configured to be executed by the processor, where the transceiver is configured to receive data forwarding information of target UE, a configured QoS flow, and a mapping relationship between a bearer and a QoS flow that are transmitted by an AMF entity, where the data forwarding information includes a list of bearers allocated by an EPS to the target UE and an indication of a determination by a source 4G base station as to whether each bearer corresponding to the target UE has data to forward;

the processor is configured to configure forwarding tunnel information of a 5G base station for the target UE according to the data forwarding information, the configured QoS flow, and the mapping relationship between a bearer and a QoS flow; and the transceiver is further configured to transmit the forwarding tunnel information of the 5G base station to the AMF.

The transceiver is further configured to receive a handover request transmitted by the AMF entity, where the handover request carries the data forwarding information, the configured QoS flow, and the mapping relationship between a bearer and a QoS flow, where the data forwarding information is located in a transparent container of the handover request; or, the data forwarding information is located in an IE of the handover request.

The transceiver is further configured to transmit a handover request ACK to the AMF entity according to the handover request, where the handover request ACK carries the forwarding tunnel information of the 5G base station, where if the data forwarding information is located in the transparent container of the handover request, the forwarding tunnel information of the 5G base station includes a 5G base station forwarding tunnel of the target UE and a bearer and/or a QoS flow of the target UE that has data to forward;

if the data forwarding information is located in the IE of the handover request, the forwarding tunnel information of the 5G base station includes the 5G base station forwarding tunnel of the target UE.

To achieve the foregoing object, the present disclosure further provides in some embodiments an AMF entity, including:

a first receiving module, configured to: receive data forwarding information of target UE forwarded by an MME, and acquire a QoS flow configured by a 5G core network for each bearer of the target UE and a mapping relationship between a bearer and a QoS flow, where the data forwarding information includes a list of bearers allocated by an EPS to the target UE and an indication of a determination by a source 4G base station as to whether each bearer corresponding to the target UE has data to forward;

a first transmission module, configured to transmit the data forwarding information, the configured QoS flow, and the mapping relationship between a bearer and a QoS flow to a target 5G base station; and a second receiving module, configured to receive forwarding tunnel information of a 5G base station configured for the target UE by the target 5G base station according to the data forwarding information, the configured QoS flow, and the mapping relationship between a bearer and a QoS flow.

To achieve the foregoing object, the present disclosure further provides in some embodiments a base station, applied to a 4G network, including:

a second transmission module, configured to: transmit data forwarding information to an MME if target UE satisfies a system handover condition, where the data forwarding information is forwarded to an AMF entity via the MME, where the data forwarding information includes a list of bearers allocated by an EPS to the target UE and an indication of a determination by the base station as to whether each bearer corresponding to the target UE has data to forward.

To achieve the foregoing object, the present disclosure further provides in some embodiments a base station, applied to a 5G network, including:

a third receiving module, configured to receive data forwarding information of target UE, a configured QoS flow, and a mapping relationship between a bearer and a QoS flow that are transmitted by an AMF entity, where the data forwarding information includes a list of bearers allocated by an EPS to the target UE and an indication of a determination by a source 4G base station as to whether each bearer corresponding to the target UE has data to forward;

a configuration module, configured to configure forwarding tunnel information of a 5G base station for the target UE according to the data forwarding information, the configured QoS flow, and the mapping relationship between a bearer and a QoS flow; and a third transmission module, configured to transmit the forwarding tunnel information of the 5G base station to the AMF.

To achieve the foregoing object, the present disclosure further provides in some embodiments a computer-readable storage medium storing therein a computer program, where the computer program is configured to be executed by a processor, to implement the steps in the foregoing method for determining a data forwarding tunnel applied to an AMF.

To achieve the foregoing object, the present disclosure further provides in some embodiments a computer-readable storage medium storing therein a computer program, where the computer program is configured to be executed by a processor, to implement the steps in the foregoing method for determining a data forwarding tunnel applied to a base station in a 4G system.

To achieve the foregoing object, the present disclosure further provides in some embodiments a computer-readable storage medium storing therein a computer program, where the computer program is configured to be executed by a processor, to implement the steps in the foregoing method for determining a data forwarding tunnel applied to a base station in a 5G system.

The beneficial effects of the foregoing technical solutions of the present disclosure are as follows: in the method for determining a data forwarding tunnel in the embodiments of the present disclosure, during a handover procedure from an EPS to a 5G system, information related to data forwarding carried in an existing message is notified to a target 5G base station, and the target 5G base station configures a 5G base station forwarding tunnel for target UE to be handed over. An AMF entity obtains a forwarding tunnel of a 5G core network from a network element of the 5G core network and notifies the forwarding tunnel to an MME. The MME then allocates a forwarding tunnel of a 4G core network to the target UE and transmits the forwarding tunnel to a source 4G base station. In this way, forwarding preparation of data forwarding during a handover from the EPS to the 5G system is implemented without impacting an EPS in the related art and without increasing signaling overhead, thereby ensuring the completion of data forwarding.

BRIEF DESCRIPTION OF THE DRAWINGS

To describe the technical solutions in the embodiments of the present disclosure more clearly, the accompanying drawings required for describing the embodiments of the present disclosure are briefly described hereinafter. Apparently, the drawings accompanying the following descriptions show only some embodiments of the present disclosure, and a person of ordinary skill in the art may still derive other drawings from these accompanying drawings without creative efforts.

DETAILED DESCRIPTION

To make the technical problem to be solved, technical solutions, and advantages of the present disclosure more clearly, detailed descriptions are provided below with reference to the accompanying drawings and specific embodiments. Apparently, the described embodiments are some embodiments of the present disclosure, but are not all the embodiments. Based on the described embodiments of the present disclosure, all other embodiments derived by a person of ordinary skill in the art without creative efforts shall fall within the scope of the present disclosure.

In view of the problem that conventional data forwarding in a handover from an EPS to a 5G system impacts the EPS in the related art and increases signaling overhead, the present disclosure provides a method for determining a data forwarding tunnel, where, by determining a data forwarding tunnel in a handover procedure from an EPS to a 5G system, allocation of data forwarding tunnels in a handover from the EPS to the 5G system is implemented without impacting an EPS in the related art and without increasing signaling overhead, thereby ensuring the completion of data forwarding.

Figure 1:
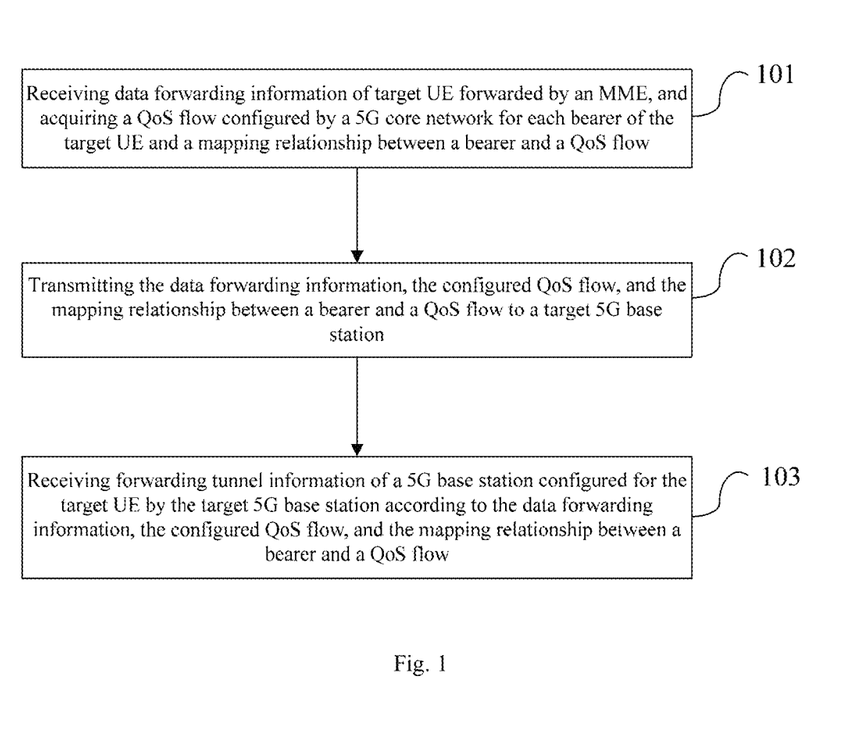
FIG. 1 is a flowchart of a method for determining a data forwarding tunnel according to a first embodiment of the present disclosure.

As shown in FIG. 1, the present disclosure provides in some embodiments a method for determining a data forwarding tunnel. The method is applied to an AMF entity, and includes the following steps.

A step 101 includes: receiving data forwarding information of target UE forwarded by an MME, and acquiring a QoS flow configured by a 5G core network for each bearer of the target UE and a mapping relationship between a bearer and a QoS flow, where the data forwarding information includes a list of bearers allocated by an EPS to the target UE and an indication of a determination by a source 4G base station as to whether each bearer corresponding to the target UE has data to forward.

A step 102 includes: transmitting the data forwarding information, the configured QoS flow, and the mapping relationship between a bearer and a QoS flow to a target 5G base station.

A step 103 includes: receiving forwarding tunnel information of a 5G base station configured for the target UE by the target 5G base station according to the data forwarding information, the configured QoS flow, and the mapping relationship between a bearer and a QoS flow.

By means of the foregoing step 101 to step 103, according to the method, applied to an AMF entity in a 5G system, for determining a data forwarding tunnel in the embodiment of the present disclosure, after data forwarding information of target UE forwarded by an MME is received and a QoS flow configured by a 5G core network for each bearer of the target UE and a mapping relationship between a bearer and a QoS flow is acquired, the data forwarding information, the configured QoS flow, and the mapping relationship between a bearer and a QoS flow are transmitted to a target 5G base station. The data forwarding information includes a list of bearers allocated by an EPS to the target UE and an indication of a determination by a source 4G base station as to whether each bearer corresponding to the target UE has data to forward, so that the target 5G base station configures forwarding tunnel information of a 5G base station for the target UE according to the received data forwarding information, QoS flow, and mapping relationship between a bearer and a QoS flow, and transmits the forwarding tunnel information to the AMF. The AMF entity can learn about forwarding channel allocation for the target UE by the target 5G base station, by receiving the forwarding tunnel information of the 5G base station, thereby ensuring subsequent completion of data forwarding. Since the foregoing steps are implemented in the 5G system, an EPS in the related art is not impacted, and signaling overhead is not increased, so that it is simpler and easier to implement data forwarding in a handover from an EPS to a 5G system.

In the embodiment, the data forwarding information is generated by the source 4G base station so as to notify the target 5G base station of a service processing condition of the target UE in a 4G system: a list of bearers (for example, a bearer 1, a bearer 2, and a bearer 3) allocated by the EPS to the target UE and whether each of the allocated bearers has downlink data to forward (for example, there is data to be forwarded in the bearer 2 and the bearer 3). Therefore, optionally, in step 101, the receiving data forwarding information of target UE forwarded by an MME includes:

receiving a forward relocation request transmitted by the MME after the MME receives a Handover Required message transmitted by the source 4G base station, where the Handover Required message carries the data forwarding information, and the forward relocation request carries the data forwarding information, where the data forwarding information is located in transparent containers of the Handover Required message and the forward relocation request respectively; or, the data forwarding information is located in IEs of the Handover Required message and the forward relocation request respectively.

Figure 2:
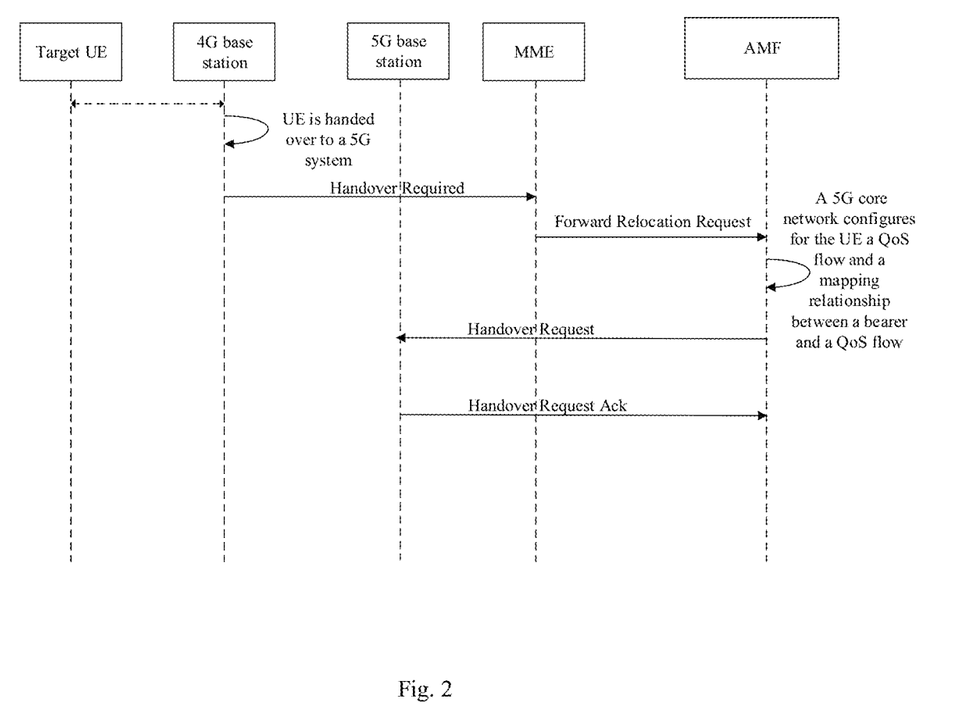
FIG. 2 is a schematic diagram of an application of a method for determining a data forwarding tunnel according to the first embodiment of the present disclosure.

Herein, as shown in FIG. 2, in conjunction with a handover procedure from the EPS to the 5G system, optionally, when the source 4G base station determines, based on a measurement report, that the target UE satisfies a handover condition from the EPS to the 5G system, the source 4G base station generates the data forwarding information including the list of bearers allocated by the EPS to the target UE and the indication of the determination by the source 4G base station as to whether each bearer corresponding to the target UE has data to forward, and transmits the data forwarding information to the MME by using the Handover Required message. The MME forwards the data forwarding information to the AMF entity by using a forward relocation request. The AMF entity can receive the carried data forwarding information by receiving the forward relocation request, to implement forwarding to the target 5G base station.

In consideration of message formats of the Handover Required message and the forward relocation request, the data forwarding information may be located in the transparent containers of the Handover Required message and the forward relocation request or located in the IEs of the Handover Required message and the forward relocation request.

It should be known that, in order to allocate a forwarding tunnel to UE, the 5G base station needs to know not only the service processing condition of the UE in the 4G system, but also the QoS flow configured by the 5G core network for each bearer of the UE and the mapping relationship between a bearer and a QoS flow. Therefore, after the AMF entity receives the forward relocation request to receive the data forwarding information, the AMF entity further converts EPS bearer context on the MME side into PDU session context used in the 5G system by using a handshake between network elements of the 5G core network, so as to acquire the QoS flow configured by the 5G core network for each bearer of the target UE and the mapping relationship between a bearer and a QoS flow.

Subsequently, in order to notify the target 5G base station of the data forwarding information, the configured QoS flow, and the mapping relationship between a bearer and a QoS flow, step 102 includes:

transmitting a handover request to the target 5G base station, where the handover request carries the data forwarding information, the configured QoS flow, and the mapping relationship between a bearer and a QoS flow, where the data forwarding information is located in a transparent container of the handover request; or, the data forwarding information is located in an IE of the handover request.

As shown in FIG. 2, corresponding to the foregoing process of carrying the data forwarding information in the Handover Required message and forwarding the data forwarding information to the AMF entity by using the forward relocation request, herein, optionally, the handover request carries the data forwarding information, the configured QoS flow, and the mapping relationship between a bearer and a QoS flow. Similarly, according to a message format of the handover request, the data forwarding information is located in a container of a handover request; or, the data forwarding information is located in the IE of the handover request.

Certainly, if the data forwarding information is located in containers of the Handover Required message and the forward relocation request respectively, the data forwarding information is also located in the container of the handover request. The data forwarding information is transparently transmitted to the target 5G base station via the MME and the AMF. If the data forwarding information is located in the IEs of the Handover Required message and the forward relocation request respectively, the data forwarding information is also located in the IE of the handover request.

After receiving the data forwarding information of the target UE, the configured QoS flow, and the mapping relationship between a bearer and a QoS flow by using the handover request transmitted by the AMF entity, the target 5G base station configures, for the target UE, the forwarding tunnel information of the 5G base station required for data forwarding, and feeds back the forwarding tunnel information to the AMF. However, because the data forwarding information may be carried in a container or an IE of a message, during transparent transmission of the data forwarding information, the AMF entity cannot know whether each bearer and/or QoS flow has data to forward. In contrast, the AMF entity knows whether each bearer and/or QoS flow has data to forward when the data forwarding information is forwarded in the IE. Therefore, the forwarding tunnel information of the 5G base station fed back by the target 5G base station is different, and step 103 includes:

receiving a handover request ACK transmitted by the target 5G base station according to the handover request, where the handover request ACK includes the forwarding tunnel information of the 5G base station, where if the data forwarding information is located in the transparent container of the handover request, the forwarding tunnel information of the 5G base station includes a 5G base station forwarding tunnel of the target UE and a bearer and/or a QoS flow of the target UE that has data to forward;

if the data forwarding information is located in the IE of the handover request, the forwarding tunnel information of the 5G base station includes the 5G base station forwarding tunnel of the target UE.

It can be seen that during transparent transmission of the data forwarding information, because the target 5G base station needs to notify the AMF entity of whether each bearer and/or QoS flow corresponding to the target UE has data to forward, the forwarding tunnel information of the 5G base station includes a 5G base station forwarding tunnel of the target UE and a bearer and/or a QoS flow of the target UE that has data to forward, and the forwarding tunnel information of the 5G base station is carried in a handover request ACK and transmitted to the AMF. After receiving the handover request Ack, the AMF entity not only obtains the 5G base station forwarding tunnel configured by the target 5G base station for the target UE, but also is aware of a bearer and/or a QoS flow of the target UE that has data to forward. When the data forwarding information is located in the IE to be forwarded, the target 5G base station does not need to notify the AMF entity of whether each bearer and/or QoS flow corresponding to the target UE has data to forward, and the forwarding tunnel information of the 5G base station only includes the 5G base station forwarding tunnel of the target UE. The forwarding tunnel information of the 5G base station is carried in the handover request ACK and transmitted to the AMF. After receiving the handover request Ack, the AMF entity obtains the 5G base station forwarding tunnel configured by the target 5G base station for the target UE.

Generally, for data forwarding in a handover from the EPS to the 5G system, not only the 5G base station forwarding tunnel needs to be determined, but also the forwarding tunnel information of the 5G core network and forwarding tunnel information of a 4G core network need to be obtained. Based on the foregoing embodiment, the method further includes the following steps: acquiring, according to the forwarding tunnel information of the 5G base station, a forwarding tunnel of the 5G core network configured by the 5G core network for the target UE, and transmitting the forwarding tunnel of the 5G core network to the MME, where the MME then allocates a forwarding tunnel of the 4G core network to the target UE and transmits the forwarding tunnel of the 4G core network to the source 4G base station.

In this way, the AMF entity receives the forwarding tunnel information of the 5G base station, further acquires, through a handshake between network elements of the 5G core network, a forwarding tunnel of the 5G core network configured by the 5G core network for the target UE, and transmits the forwarding tunnel of the 5G core network to the MME. The MME further allocates a forwarding tunnel of the 4G core network to the target UE and transmits the forwarding tunnel of the 4G core network to the source 4G base station. At this point, the configuration of a data forwarding tunnel is completed. Subsequently, forwarding data present in a bearer of the source 4G base station may be forwarded.

The application of the method in the embodiment of the present disclosure is described below with reference to specific scenarioes.

Scenario 1: UE A operates in the EPS. Two PDN connections, namely, a PDN 1 (a non-guaranteed bit rate (GBR) EPS bearer 1) and a PDN 2 (a non-GBR EPS bearer 2), are established. Only the bearer 1 has data to forward. Based on a measurement report, a 4G evolved node B (eNB) determines to hand over the UE A to a 5G system.

As shown in FIG. 2, the IE of the Handover Required message transmitted by the eNB (the source 4G base station) carries a list of bearers (the bearers 1 and 2) allocated by the EPS to UE and an indication that indicates whether each bearer has data to forward (the bearer 1 has data to forward). After the MME receives the Handover Required message, the foregoing information is carried in an IE of the forward relocation request and is transmitted to the AMF. It is assumed that the 5G core network configures the following for the UE: a PDU session 1 (a QoS flow 1) and a PDU session 2 (a QoS flow 2); and the mapping relationship between a bearer and a QoS flow: the bearer 1 is mapped to the QoS flow 1, and the bearer 2 is mapped to the QoS flow 2. Subsequently, the AMF entity uses the handover request transmitted to the target 5G base station to notify the target 5G base station of the configured QoS flow, the mapping relationship, and the information in the IE. The target 5G base station configures a 5G base station forwarding tunnel of the UE by using the obtained information. A data forwarding tunnel allocated to the PDU session 1 is used to forward data forwarded in the QoS flow 1. The 5G base station forwarding tunnel is fed back to the AMF entity by using a handover request Ack.

Scenario 2: UE B operates in the EPS. Two PDN connections, namely, a PDN 1 (non-GBR EPS bearers 1 and 2) and a PDN 2 (GBR EPS bearers 3 and 4), are established. The bearers 1, 3, and 4 have data to forward. Based on a measurement report, the eNB determines to hand over the UE B to a 5G system.

As shown in FIG. 2, a container of a Handover Required message transmitted by the eNB (the source 4G base station) carries a list of bearers (the bearers 1, 2, 3, and 4) allocated by the EPS to UE and an indication that indicates whether each bearer has data to forward (the bearers 1, 3, and 4 have data to forward). After the MME receives the Handover Required message, the foregoing information is carried in a container of the forward relocation request and is transmitted to the AMF. It is assumed that the 5G core network configures the following for the UE: a PDU session 1 (QoS flows 1 and 2) and a PDU session 2 (QoS flows 3 and 4); and the mapping relationship between a bearer and a QoS flow: the bearer 1 is mapped to the QoS flow 1, the bearer 2 is mapped to the QoS flow 2, the bearer 3 is mapped to the QoS flow 3, and the bearer 4 is mapped to the QoS flow 4. Subsequently, the AMF entity uses the handover request transmitted to the target 5G base station to notify the target 5G base station of the configured QoS flow, the mapping relationship, and the information in the container. The target 5G base station configures a 5G base station forwarding tunnel of the UE by using the obtained information. A data forwarding tunnel allocated to the PDU session 1 is used to forward data forwarded in the QoS flow 1. A data forwarding tunnel allocated to the PDU session 2 is used to forward data forwarded in the QoS flows 3 and 4. The 5G base station forwarding tunnels are fed back to the AMF entity by using a handover request Ack. The handover request Ack further carries information as to whether each bearer and/or QoS flow corresponding to the target UE has data to forward, so as to notify the AMF entity that the bearers 1, 3, and 4 and/or the QoS flows 1, 3, and 4 have data to forward.

It should further be known that the mapping relationship between a bearer and a QoS flow configured by the 5G core network is not limited to the foregoing one-to-one correspondence, and may be alternatively a one-to-many relationship or a many-to-one relationship; similarly, there are also various manners of tunnel configuration, which is not elaborated herein.

In conclusion, in the method for determining a data forwarding tunnel according to the embodiment of the present disclosure, during a handover procedure from an EPS to a 5G system, information related to data forwarding is notified to a target 5G base station by being carried in an existing message, so that the target 5G base station configures a 5G base station forwarding tunnel for target UE to be handed over. An AMF entity obtains a forwarding tunnel of a 5G core network from a network element of the 5G core network and notifies an MME of the forwarding tunnel. The MME then allocates a forwarding tunnel of a 4G core network to the target UE and transmits the forwarding tunnel to a source 4G base station. In this way, forwarding preparation of forwarding data during a handover from the EPS to the 5G system is implemented without impacting an EPS in the related art and without increasing signaling overhead, thereby ensuring the completion of data forwarding.

Figure 3:
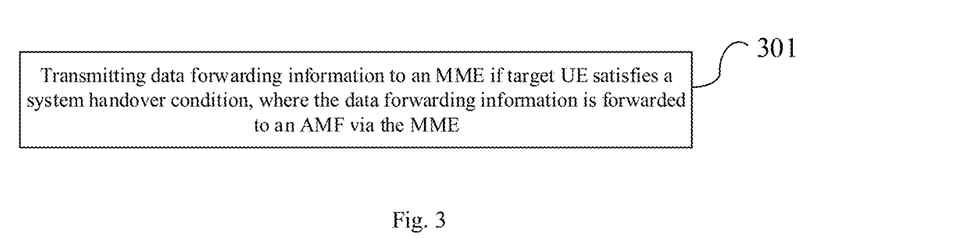
FIG. 3 is a flowchart of a method for determining a data forwarding tunnel according to a second embodiment of the present disclosure.

As shown in FIG. 3, the present disclosure provides in some embodiments a method for determining a data forwarding tunnel. The method is applied to a 4G base station, and includes the following steps.

A step 301 includes: transmitting data forwarding information to an MME if target UE satisfies a system handover condition, where the data forwarding information is forwarded to an AMF entity via the MME.

The data forwarding information includes a list of bearers allocated by an EPS to the target UE and an indication of a determination by the 4G base station as to whether each bearer corresponding to the target UE has data to forward.

In this way, When a source 4G base station to which the method in the embodiment of the present disclosure is applied determines, based on a measurement report, that a target UE satisfies a handover condition from an EPS to a 5G system, the source 4G base station generates and transmits data forwarding information that includes a list of bearers allocated by the EPS to the target UE and an indication of a determination by the source 4G base station as to whether each bearer corresponding to the target UE has data to forward to an MME, so that the MME forwards the data forwarding information to an AMF entity, and the AMF entity then forwards the data forwarding information to a target 5G base station, so as to notify the target 5G base station of a service processing condition of the target UE in a 4G system to facilitate a 5G base station forwarding tunnel configuration.

The transmitting data forwarding information to an MME includes: transmitting a Handover Required message carrying the data forwarding information to the MME.

In conjunction with a handover procedure from the EPS to the 5G system, optionally, the source 4G base station transmits the Handover Required message to the MME.

In consideration of a message format of the Handover Required message, the data forwarding information is located in a transparent container of the Handover Required message; or, the data forwarding information is located in an IE of the Handover Required message.

The data forwarding information may be located in the transparent container of the Handover Required message, or located in an IE of the Handover Required message for transfer.

In the method for determining a data forwarding tunnel in the embodiment of the present disclosure, when it is found that a target UE satisfies a handover condition from an EPS to a 5G system, data forwarding information that includes a list of bearers allocated by the EPS to the target UE and an indication of a determination by a source 4G base station as to whether each bearer corresponding to the target UE has data to forward is generated and transmitted to an MME, so that the MME forwards the data forwarding information to an AMF entity, and the AMF entity then forwards the data forwarding information to a target 5G base station, so as to notify the target 5G base station of a service processing condition of the target UE in a 4G system to facilitate a 5G base station forwarding tunnel configuration. An EPS in the related art is not impacted, and signaling overhead is not increased, so that it is simpler and easier to implement data forwarding in a handover from an EPS to a 5G system.

It should be noted that, the method for determining a data forwarding tunnel in the embodiment of the present disclosure is accomplished in conjunction with the method for determining a data forwarding tunnel applied to an AMF.

Implementations of embodiments of the foregoing method for determining a data forwarding tunnel applied to an AMF entity are applicable to the embodiment and can achieve the same technical effects.

Figure 4:
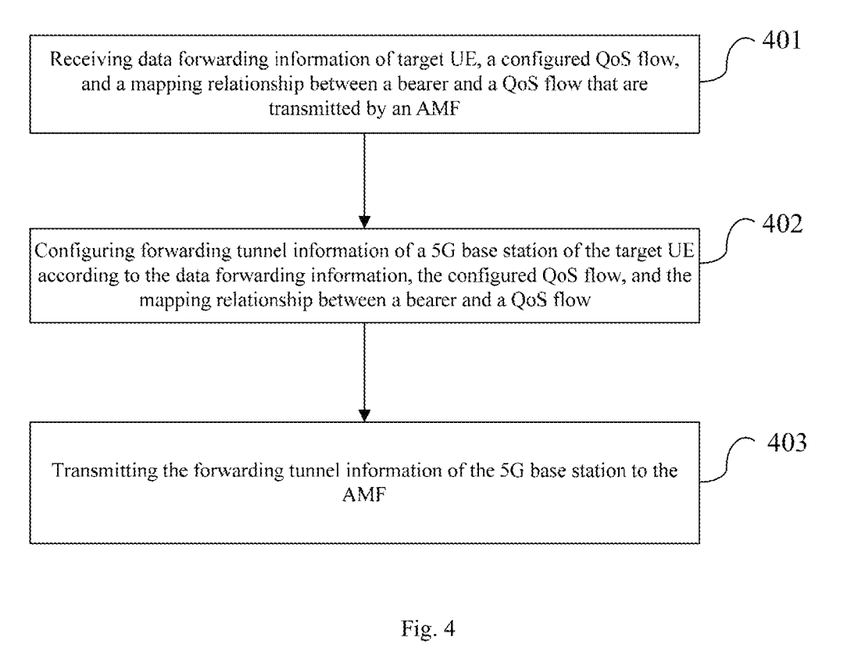
FIG. 4 is a flowchart of a method for determining a data forwarding tunnel according to a third embodiment of the present disclosure.

As shown in FIG. 4, the present disclosure provides in some embodiments a method for determining a data forwarding tunnel. The method is applied to a 5G base station, and includes the following steps.

A step 401 includes: receiving data forwarding information of target UE, a configured QoS flow, and a mapping relationship between a bearer and a QoS flow that are transmitted by an AMF entity, where the data forwarding information includes a list of bearers allocated by an EPS to the target UE and an indication of a determination by a source 4G base station as to whether each bearer corresponding to the target UE has data to forward.

A step 402 includes: configuring forwarding tunnel information of a 5G base station for the target UE according to the data forwarding information, the configured QoS flow, and the mapping relationship between a bearer and a QoS flow.

A step 403 includes: transmitting the forwarding tunnel information of the 5G base station to the AMF.

By means of the foregoing step 401 to step 403, according to the method for determining a data forwarding tunnel in the embodiment of the present disclosure applied to a base station in a 5G system, after data forwarding information, a configured QoS flow, and a mapping relationship between a bearer and a QoS flow transmitted by an AMF entity are received, a bearer having data to forward among bearers of the target UE and a QoS flow configured by a 5G core network for the bearer having data to forward may be obtained, thereby forwarding tunnel information of a 5G base station may be configured accurately for the target UE and transmitted to the AMF entity, so that the completion of subsequent data forwarding is ensured.

As can be seen from the embodiment of the method for determining a data forwarding tunnel applied to an AMF entity in a 5G system, the AMF entity optionally transmits a handover request carrying the data forwarding information, the configured QoS flow, and the mapping relationship between a bearer and a QoS flow to a target 5G base station. Therefore, step 401 includes:

receiving a handover request transmitted by the AMF entity, where the handover request carries the data forwarding information, the configured QoS flow, and the mapping relationship between a bearer and a QoS flow, where the data forwarding information is located in a transparent container of the handover request; or, the data forwarding information is located in an IE of the handover request.

However, because the data forwarding information may be carried in a container or an IE of a message, during transparent transmission of the data forwarding information, the AMF entity cannot know whether each bearer and/or QoS flow has data to forward. In contrast, the AMF entity knows whether each bearer and/or QoS flow has data to forward when the data forwarding information is forwarded in the IE.

Therefore, the step 403 includes: transmitting a handover request ACK to the AMF entity according to the handover request, where the handover request ACK carries the forwarding tunnel information of the 5G base station, where if the data forwarding information is located in the transparent container of the handover request, the forwarding tunnel information of the 5G base station includes a 5G base station forwarding tunnel of the target UE and a bearer and/or a QoS flow of the target UE that has data to forward; and if the data forwarding information is located in the IE of the handover request, the forwarding tunnel information of the 5G base station includes the 5G base station forwarding tunnel of the target UE.

Herein, during transparent transmission of the data forwarding information, because the target 5G base station needs to notify the AMF entity of whether each bearer and/or QoS flow corresponding to the target UE has data to forward, the forwarding tunnel information of the 5G base station includes a 5G base station forwarding tunnel of the target UE and a bearer and/or a QoS flow of the target UE that has data to forward, and the forwarding tunnel information of the 5G base station is carried in a handover request ACK and transmitted to the AMF. When the data forwarding information is located in the IE to be forwarded, the target 5G base station does not need to notify the AMF entity of whether each bearer and/or QoS flow corresponding to the target UE has data to forward, the forwarding tunnel information of the 5G base station only includes the 5G base station forwarding tunnel of the target UE, and the forwarding tunnel information of the 5G base station is carried in the handover request ACK and transmitted to the AMF.

In the method for determining a data forwarding tunnel in the embodiment of the present disclosure, after data forwarding information, a configured QoS flow, and a mapping relationship between a bearer and a QoS flow transmitted by an AMF entity are received, a bearer having data to forward among bearers of the target UE and a QoS flow configured by a 5G core network for the bearer having data to forward may be obtained, thereby forwarding tunnel information of a 5G base station may be configured accurately for the target UE and transmitted to the AMF. An EPS in the related art is not impacted, and signaling overhead is not increased, so that the completion of subsequent data forwarding is ensured, and it is simpler and easier to implement data forwarding in a handover from an EPS to a 5G system.

It should be noted that, the method for determining a data forwarding tunnel in the embodiment of the present disclosure is accomplished in conjunction with the method for determining a data forwarding tunnel applied to an AMF. Implementations of embodiments of the foregoing method for determining a data forwarding tunnel applied to an AMF entity are applicable to the embodiment and can achieve the same technical effects.

Figure 5:
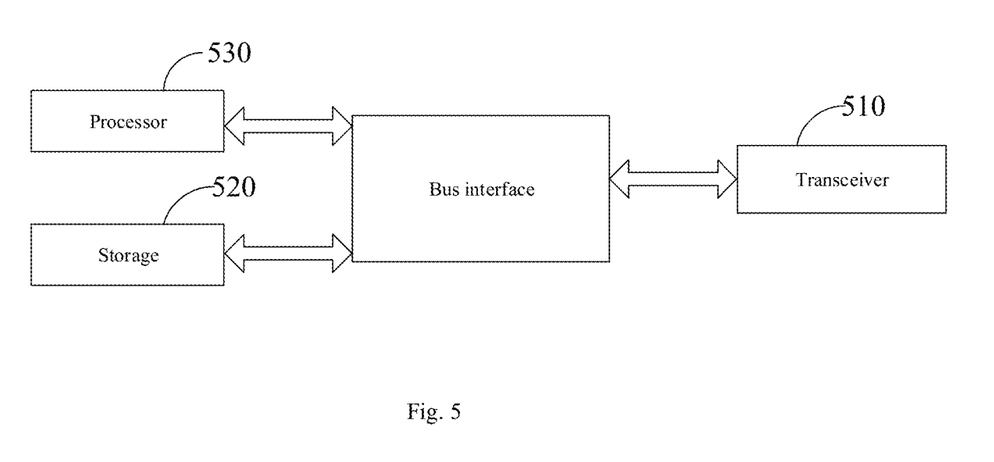
FIG. 5 is a schematic structural diagram of an AMF entity according to an embodiment of the present disclosure.

As shown in FIG. 5, the present disclosure provides in some embodiments an AMF entity, including: a transceiver 510, a storage 520, a processor 530, and a computer program stored in the storage 520 and configured to be executed by the processor 530.

The transceiver 510 is configured to: receive data forwarding information of target UE forwarded by an MME, and acquire a QoS flow configured by a 5G core network for each bearer of the target UE and a mapping relationship between a bearer and a QoS flow, where the data forwarding information includes a list of bearers allocated by an EPS to the target UE and an indication of a determination by a source 4G base station as to whether each bearer corresponding to the target UE has data to forward; transmit the data forwarding information, the configured QoS flow, and the mapping relationship between a bearer and a QoS flow to a target 5G base station; and receive forwarding tunnel information of a 5G base station configured for the target UE by the target 5G base station according to the data forwarding information, the configured QoS flow, and the mapping relationship between a bearer and a QoS flow.

The transceiver 510 is further configured to receive a forward relocation request transmitted by the MME after the MME receives a Handover Required message transmitted by the source 4G base station, where the Handover Required message carries the data forwarding information, and the forward relocation request carries the data forwarding information, where the data forwarding information is located in transparent containers of the Handover Required message and the forward relocation request respectively; or, the data forwarding information is located in IEs of the Handover Required message and the forward relocation request respectively.

The transceiver 510 is further configured to transmit a handover request to the target 5G base station, where the handover request carries the data forwarding information, the configured QoS flow, and the mapping relationship between a bearer and a QoS flow, where the data forwarding information is located in a transparent container of the handover request; or, the data forwarding information is located in an IE of the handover request.

The transceiver 510 is further configured to receive a handover request ACK transmitted by the target 5G base station according to the handover request, where the handover request ACK includes the forwarding tunnel information of the 5G base station, where if the data forwarding information is located in the transparent container of the handover request, the forwarding tunnel information of the 5G base station includes a 5G base station forwarding tunnel of the target UE and a bearer and/or a QoS flow of the target UE that has data to forward;

if the data forwarding information is located in the IE of the handover request, the forwarding tunnel information of the 5G base station includes the 5G base station forwarding tunnel of the target UE.

The transceiver 510 is further configured to: acquire, according to the forwarding tunnel information of the 5G base station, a forwarding tunnel of the 5G core network configured by the 5G core network for the target UE, and transmit the forwarding tunnel of the 5G core network to the MME, where the MME then allocates a forwarding tunnel of a 4G core network to the target UE and transmits the forwarding tunnel of the 4G core network to the source 4G base station.

In FIG. 5, a bus architecture may include any quantity of interconnected buses and bridges. Specifically, various circuits such as one or more processors represented by the processor 530 and a storage represented by the storage 520 are linked together. The bus architecture may also link various other circuits such as peripherals, voltage regulators, and power management circuits, which are well known in the art, and therefore are not further described herein. The bus interface provides an interface. The transceiver 510 may include a plurality of elements, that is, a transmitter and a receiver, to provide units for communicating with various other apparatuses over a transmission medium. The processor 530 is responsible for managing the bus architecture and general processing. The storage 520 can store data used by the processor 530 while performing operations.

Figure 6:
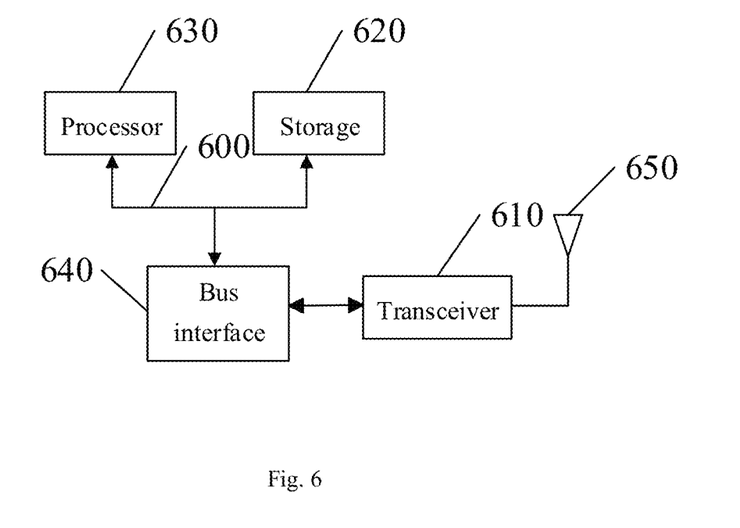
FIG. 6 is a schematic structural diagram of a base station according to an embodiment of the present disclosure.

As shown in FIG. 6, the present disclosure further provides in some embodiments a base station, applied to a 4G system, including: a transceiver 610, a storage 620, a processor 630, and a computer program stored in the storage 620 and configured to be executed by the processor 630.

The transceiver 610 is configured to: transmit data forwarding information to an MME if target UE satisfies a system handover condition, where the data forwarding information is forwarded to an AMF entity via the MME, where the data forwarding information includes a list of bearers allocated by an EPS to the target UE and an indication of a determination by the base station as to whether each bearer corresponding to the target UE has data to forward.

The transceiver 610 is further configured to transmit a Handover Required message carrying the data forwarding information to the MME.

The data forwarding information is located in a transparent container of the Handover Required message; or, the data forwarding information is located in an IE of the Handover Required message.

Also as shown in FIG. 6, the present disclosure further provides in some embodiments a base station, applied to a 5G system, including: a transceiver 610, a storage 620, a processor 630, a computer program stored in the storage 620 and configured to be executed by the processor 630.

The transceiver 610 is configured to receive data forwarding information of target UE, a configured QoS flow, and a mapping relationship between a bearer and a QoS flow that are transmitted by an AMF entity, where the data forwarding information includes a list of bearers allocated by an EPS to the target UE and an indication of a determination by a source 4G base station as to whether each bearer corresponding to the target UE has data to forward.

The processor 630 is configured to configure forwarding tunnel information of a 5G base station for the target UE according to the data forwarding information, the configured QoS flow, and the mapping relationship between a bearer and a QoS flow.

The transceiver 610 is further configured to transmit the forwarding tunnel information of the 5G base station to the AMF.

The transceiver 610 is further configured to receive a handover request transmitted by the AMF entity, where the handover request carries the data forwarding information, the configured QoS flow, and the mapping relationship between a bearer and a QoS flow, where the data forwarding information is located in a transparent container of the handover request; or, the data forwarding information is located in an IE of the handover request.

The transceiver 610 is further configured to transmit a handover request ACK to the AMF entity according to the handover request, where the handover request ACK carries the forwarding tunnel information of the 5G base station, where if the data forwarding information is located in the transparent container of the handover request, the forwarding tunnel information of the 5G base station includes a 5G base station forwarding tunnel of the target UE and a bearer and/or a QoS flow of the target UE that has data to forward;

if the data forwarding information is located in the IE of the handover request, the forwarding tunnel information of the 5G base station includes the 5G base station forwarding tunnel of the target UE.

In FIG. 6, a bus architecture (represented by a bus 600) is shown, the bus 600 may include any quantity of interconnected buses and bridges. The bus 600 links various circuits such as one or more processors represented by the processor 630 and a storage represented by the storage 620 together. The bus 600 may also link various other circuits such as peripherals, voltage regulators, and power management circuits, which are well known in the art, and therefore are not further described herein. The bus interface 640 provides an interface between the bus 600 and the transceiver 610. The transceiver 610 may be one element or may be a plurality of elements, for example, a plurality of receivers and a plurality of transmitters, to provide units for communicating with various other apparatuses over a transmission medium. Data processed by the processor 630 is transmitted by an antenna 650 via a wireless medium. Further, the antenna 650 receives data and transmits the data to the processor 630.

The processor 630 is responsible for managing the bus 600 and general processing, and may further provide various functions including timing, peripheral interface, voltage regulation, power management, and other control functions. The storage 620 may be configured to store data used by the processor 630 while performing operations.

Optionally, the processor 630 may be a central processing unit (CPU), an application-specific integrated circuit (ASIC), a field-programmable gate array (FPGA) or a complex programmable logic device (CPLD).

Figure 7:
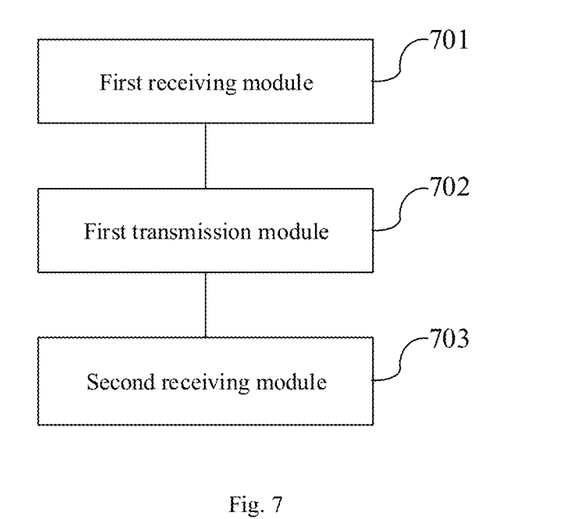
FIG. 7 is a schematic structural diagram of an AMF entity according to another embodiment of the present disclosure.

As shown in FIG. 7, the present disclosure further provides in some embodiments an AMF entity, including:

a first receiving module 701, configured to: receive data forwarding information of target UE forwarded by an MME, and acquire a QoS flow configured by a 5G core network for each bearer of the target UE and a mapping relationship between a bearer and a QoS flow, where the data forwarding information includes a list of bearers allocated by an EPS to the target UE and an indication of a determination by a source 4G base station as to whether each bearer corresponding to the target UE has data to forward;

a first transmission module 702, configured to transmit the data forwarding information, the configured QoS flow, and the mapping relationship between a bearer and a QoS flow to a target 5G base station; and a second receiving module 703, configured to receive forwarding tunnel information of a 5G base station configured for the target UE by the target 5G base station according to the data forwarding information, the configured QoS flow, and the mapping relationship between a bearer and a QoS flow.

The first receiving module is further configured to: receive a forward relocation request transmitted by the MME after the MME receives a Handover Required message transmitted by the source 4G base station, where the Handover Required message carries the data forwarding information, and the forward relocation request carries the data forwarding information, where the data forwarding information is located in transparent containers of the Handover Required message and the forward relocation request respectively; or, the data forwarding information is located in IEs of the Handover Required message and the forward relocation request respectively.

The first transmission module is further configured to: transmit a handover request to the target 5G base station, where the handover request carries the data forwarding information, the configured QoS flow, and the mapping relationship between a bearer and a QoS flow, where the data forwarding information is located in a transparent container of the handover request; or, the data forwarding information is located in an IE of the handover request.

The second receiving module is further configured to: receive a handover request ACK transmitted by the target 5G base station according to the handover request, where the handover request ACK includes the forwarding tunnel information of the 5G base station, where if the data forwarding information is located in the transparent container of the handover request, the forwarding tunnel information of the 5G base station includes a 5G base station forwarding tunnel of the target UE and a bearer and/or a QoS flow of the target UE that has data to forward;

if the data forwarding information is located in the IE of the handover request, the forwarding tunnel information of the 5G base station includes the 5G base station forwarding tunnel of the target UE.

The AMF entity further includes: a processing module, configured to: acquire, according to the forwarding tunnel information of the 5G base station, a forwarding tunnel of the 5G core network configured by the 5G core network for the target UE, and transmit the forwarding tunnel of the 5G core network to the MME, where the MME then allocates a forwarding tunnel of a 4G core network to the target UE and transmits the forwarding tunnel of the 4G core network to the source 4G base station.

It should be noted that, the AMF entity is a device to which the method for determining a data forwarding tunnel in the foregoing first embodiment is applied. Implementations of embodiments of the method for determining a data forwarding tunnel in the foregoing first embodiment are applicable to the device and can achieve the same technical effects.

It can be seen that, according to the AMF entity in the embodiment of the present disclosure, during a handover procedure from an EPS to a 5G system, information related to data forwarding is notified to a target 5G base station by being carried in an existing message, so that the target 5G base station configures a 5G base station forwarding tunnel for target UE to be handed over. The AMF entity obtains a forwarding tunnel of a 5G core network from a network element of the 5G core network and notifies an MME of the forwarding tunnel. The MME then allocates a forwarding tunnel of a 4G core network to the target UE and transmits the forwarding tunnel to a source 4G base station. In this way, forwarding preparation of forwarding data during a handover from the EPS to the 5G system is implemented without impacting an EPS in the related art and without increasing signaling overhead, thereby ensuring the completion of data forwarding.

Figure 8:
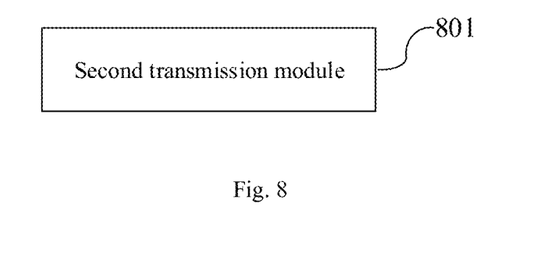
FIG. 8 is a schematic structural diagram of a base station of a 4G system according to another embodiment of the present disclosure.

As shown in FIG. 8, the present disclosure further provides in some embodiments a base station, applied to a 4G network, including:

a second transmission module 801, configured to: transmit data forwarding information to an MME if target UE satisfies a system handover condition, where the data forwarding information is forwarded to an AMF entity via the MME, where the data forwarding information includes a list of bearers allocated by an EPS to the target UE and an indication of a determination by the base station as to whether each bearer corresponding to the target UE has data to forward.

The second transmission module is further configured to: transmit a Handover Required message carrying the data forwarding information to the MME, where the data forwarding information is located in a transparent container of the Handover Required message; or, the data forwarding information is located in an IE of the Handover Required message.

It should be noted that, the base station is a base station to which the method for determining a data forwarding tunnel in the foregoing second embodiment is applied. Implementations of embodiments of the method for determining a data forwarding tunnel in the foregoing second embodiment are applicable to the base station and can achieve the same technical effects.

It can be seen that, according to the base station in the embodiment of the present disclosure, when it is found that target UE satisfies a handover condition from an EPS to a 5G system, data forwarding information that includes a list of bearers allocated by the EPS to the target UE and an indication of a determination by a source 4G base station as to whether each bearer corresponding to the target UE has data to forward is generated and transmitted to an MME, so that the MME forwards the data forwarding information to an AMF entity, and the AMF entity then forwards the data forwarding information to a target 5G base station, so as to notify the target 5G base station of a service processing condition of the target UE in a 4G system to facilitate a 5G base station forwarding tunnel configuration. An EPS in the related art is not impacted, and signaling overhead is not increased, so that it is simpler and easier to implement data forwarding in a handover from an EPS to a 5G system.

Figure 9:
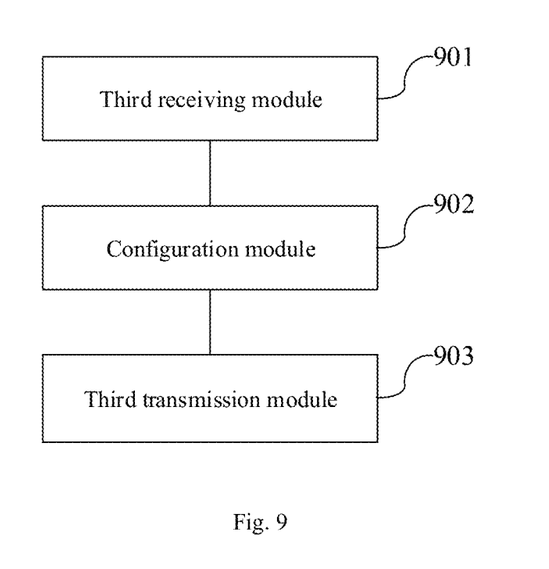
FIG. 9 is a schematic structural diagram of a base station of a 5G system according to another embodiment of the present disclosure.

As shown in FIG. 9, the present disclosure further provides in some embodiments a base station, applied to a 5G network, including:

a third receiving module 901, configured to receive data forwarding information of target UE, a configured QoS flow, and a mapping relationship between a bearer and a QoS flow that are transmitted by an AMF entity, where the data forwarding information includes a list of bearers allocated by an EPS to the target UE and an indication of a determination by a source 4G base station as to whether each bearer corresponding to the target UE has data to forward;

a configuration module 902, configured to configure forwarding tunnel information of a 5G base station for the target UE according to the data forwarding information, the configured QoS flow, and the mapping relationship between a bearer and a QoS flow; and a third transmission module 903, configured to transmit the forwarding tunnel information of the 5G base station to the AMF.

The third receiving module is further configured to: receive a handover request transmitted by the AMF entity, where the handover request carries the data forwarding information, the configured QoS flow, and the mapping relationship between a bearer and a QoS flow, where the data forwarding information is located in a transparent container of the handover request; or, the data forwarding information is located in an IE of the handover request.

The third transmission module is further configured to: transmit a handover request ACK to the AMF entity according to the handover request, where the handover request ACK carries the forwarding tunnel information of the 5G base station, where if the data forwarding information is located in the transparent container of the handover request, the forwarding tunnel information of the 5G base station includes a 5G base station forwarding tunnel of the target UE and a bearer and/or a QoS flow of the target UE that has data to forward;

if the data forwarding information is located in the IE of the handover request, the forwarding tunnel information of the 5G base station includes the 5G base station forwarding tunnel of the target UE.

It should be noted that, the base station is a base station to which the method for determining a data forwarding tunnel in the foregoing third embodiment is applied. Implementations of embodiments of the method for determining a data forwarding tunnel in the foregoing third embodiment are applicable to the base station and can achieve the same technical effects.

It can be seen that, according to the base station in the embodiment of the present disclosure, after data forwarding information, a configured QoS flow, and a mapping relationship between a bearer and a QoS flow transmitted by an AMF entity are received, the base station may be aware of a bearer having data to forward among bearers of the target UE and a QoS flow configured by a 5G core network for the bearer having data to forward, thereby configures accurately forwarding tunnel information of a 5G base station for the target UE and transmits the forwarding tunnel information to the AMF. An EPS in the related art is not impacted, and signaling overhead is not increased, so that the completion of subsequent data forwarding is ensured, and it is simpler and easier to implement data forwarding in a handover from an EPS to a 5G system.

The present disclosure further provides in some embodiments a computer-readable storage medium storing therein a computer program, where the computer program is configured to be executed by a processor, to implement the foregoing method for determining a data forwarding tunnel applied to an AMF.

The present disclosure further provides in some embodiments a computer-readable storage medium storing therein a computer program, where the computer program is configured to be executed by a processor, to implement the foregoing method for determining a data forwarding tunnel applied to a base station in a 4G system.

The present disclosure further provides in some embodiments a computer-readable storage medium storing therein a computer program, where the computer program is configured to be executed by a processor, to implement the foregoing method for determining a data forwarding tunnel applied to a base station in a 5G system.

The computer-readable storage medium may be, for example, a read-only memory (ROM), a random access memory (RAM), a magnetic disk, an optical disc or the like.

It should further be noted that many functional components described in the description are referred to as modules, so as to more particularly emphasize the independence of the implementation thereof.

In the embodiments of the present disclosure, the module may be implemented by software, so as to be executed by various types of processors. For example, an identified executable code module may include one or more physical or logical blocks of computer instructions, for instance, which may be constructed as an object, a process or a function. Nevertheless, executable codes of the identified module do not need to be physically located together, but may include different instructions stored in different physical locations. When logically combined, these instructions constitute a module and achieve the specified purpose of the module.

In practice, the executable code module may be a single instruction or a plurality of instructions, and may even be distributed over a plurality of different code segments, distributed among different programs, or distributed across multiple storage devices. Similarly, operating data may be identified within the module and may be implemented in any suitable form and organized within any suitable type of data structure. The operating data may be collected as a single data set or may be distributed at different positions (including different storage devices) and may at least partially exist only as electronic signals on a system or network.

When the module can be implemented by software, taking the technical level of hardware processes in the related art into account, the functions of module implementable by software may be achieved by constructing corresponding hardware circuit by those skilled in the art with no regard to cost. The hardware circuit includes a conventional very large scale integration (VLSI) circuit or a gate array and conventional semiconductor devices such as a logic chip and a transistor or other discrete components. The module may also be implemented by a programmable hardware device such as a field programmable gate array, a programmable logic array or a programmable logic device.

Exemplary embodiments are described above with reference to the accompanying drawings. Many different forms and embodiments are possible without deviating from the spirit and teachings of the present disclosure and thus the present disclosure should not be construed as being limited to the exemplary embodiments set forth herein. Rather, these exemplary embodiments are provided so that the present disclosure will be thorough and complete, and will fully convey the scope of the present disclosure to those skilled in the art. In the drawings, the sizes and relative sizes of components may be exaggerated for clarity. The terminology used herein is for the purpose of describing particular exemplary embodiments only and is not intended to be limiting. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, members and/or components, but do not preclude the presence or addition of one or more other features, integers, steps, operations, members, components, and/or groups thereof. Unless otherwise specified, a range of values, when recited, includes both the upper and lower limits of the range, as well as any sub-ranges therebetween.

The foregoing descriptions are optional implementations of the present disclosure. It should be noted that improvements and modifications may be made in the embodiments by a person skilled in the art without departing from the principle of the present disclosure. These improvements and modifications should be construed as falling within the scope of the present disclosure.

What is claimed is:

1. A method for determining a data forwarding tunnel, applied to an access and mobility management function (AMF) entity, comprising:
receiving data forwarding information of target user equipment (UE) forwarded by a mobility management entity (MME), and acquiring a quality of service (QoS) flow configured by a fifth-generation mobile communication (5G) core network for each bearer of the target UE, and a mapping relationship between a bearer and a QoS flow, wherein the data forwarding information comprises a list of bearers allocated by an evolved packet system (EPS) to the target UE and an indication of a determination by a source fourth-generation mobile communication (4G) base station as to whether each bearer corresponding to the target UE has data to forward;
transmitting the data forwarding information, the configured QoS flow, and the mapping relationship between a bearer and a QoS flow to a target 5G base station; and
receiving forwarding tunnel information of a 5G base station configured for the target UE by the target 5G base station according to the data forwarding information, the configured QoS flow, and the mapping relationship between a bearer and a QoS flow;

wherein the receiving data forwarding information of the target UE forwarded by the MME comprises:
receiving a forward relocation request transmitted by the MME after the MME receives a Handover Required message transmitted by the source 4G base station, wherein the Handover Required message carries the data forwarding information, and the forward relocation request carries the data forwarding information,
wherein the transmitting the data forwarding information, the configured QoS flow, and the mapping relationship between a bearer and a QoS flow to a target 5G base station comprises:
transmitting a handover request to the target 5G base station, wherein the handover request carries the data forwarding information, the configured QoS flow, and the mapping relationship between a bearer and a QoS flow,
wherein the data forwarding information is located in transparent containers of the Handover Required message, the forward relocation request and the handover request respectively.

2. The method according to claim 1, wherein the receiving the forwarding tunnel information of the 5G base station configured for the target UE by the target 5G base station comprises:
receiving a handover request acknowledgement (ACK) transmitted by the target 5G base station according to the handover request, wherein the handover request ACK comprises the forwarding tunnel information of the 5G base station, wherein
the forwarding tunnel information of the 5G base station comprises a 5G base station forwarding tunnel of the target UE and a bearer and/or a QoS flow of the target UE that has data to forward.

3. The method according to claim 1, further comprising:
acquiring, according to the forwarding tunnel information of the 5G base station, a forwarding tunnel of the 5G core network configured by the 5G core network for the target UE, and transmitting the forwarding tunnel of the 5G core network to the MME, wherein the MME allocates a forwarding tunnel of a 4G core network to the target UE and transmits the forwarding tunnel of the 4G core network to the source 4G base station.

4. An access and mobility management function (AMF) entity, comprising: a transceiver, a storage, a processor, and a computer program stored in the storage and configured to be executed by the processor, wherein
the transceiver is configured to implement the steps in the method for determining a data forwarding tunnel according to claim 1.

5. The AMF entity according to claim 4, wherein
the transceiver is further configured to: acquire, according to the forwarding tunnel information of the 5G base station, a forwarding tunnel of the 5G core network configured by the 5G core network for the target UE, and transmit the forwarding tunnel of the 5G core network to the MME, wherein the MME allocates a forwarding tunnel of a 4G core network to the target UE and transmits the forwarding tunnel of the 4G core network to the source 4G base station.

6. The AMF entity according to claim 4, wherein, when the transceiver is configured to transmit a handover request to the target 5G base station, the transceiver is further configured to receive a handover request acknowledgement (ACK) transmitted by the target 5G base station according to the handover request, the handover request ACK comprises the forwarding tunnel information of the 5G base station, wherein
the forwarding tunnel information of the 5G base station comprises a 5G base station forwarding tunnel of the target UE and a bearer and/or a QoS flow of the target UE that has data to forward.

* * * * *